(12) United States Patent
Nakakura et al.

(10) Patent No.: US 11,203,291 B2
(45) Date of Patent: Dec. 21, 2021

(54) CONTROLLER AND CONTROL SYSTEM

(71) Applicant: Shimano Inc., Osaka (JP)

(72) Inventors: Masahiro Nakakura, Osaka (JP); Kazuki Koshiyama, Osaka (JP); Toshihiko Takahashi, Osaka (JP); Satoshi Shahana, Osaka (JP); Hitoshi Takayama, Osaka (JP); Masafumi Tanaka, Osaka (JP); Yasuhiro Nakashima, Osaka (JP); Takafumi Nishino, Osaka (JP); Shingo Sakurai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/180,347

(22) Filed: Nov. 5, 2018

(65) Prior Publication Data
US 2019/0152389 A1   May 23, 2019

(30) Foreign Application Priority Data

Nov. 21, 2017 (JP) .............................. JP2017-223847

(51) Int. Cl.
| | |
|---|---|
| *B60Q 9/00* | (2006.01) |
| *B62J 6/00* | (2020.01) |
| *B62J 3/00* | (2020.01) |
| *B60Q 5/00* | (2006.01) |
| *B62M 9/122* | (2010.01) |
| *B62J 1/08* | (2006.01) |
| *B62M 6/45* | (2010.01) |
| *B62K 25/04* | (2006.01) |

(Continued)

(52) U.S. Cl.
CPC ............... *B60Q 9/00* (2013.01); *B60Q 5/005* (2013.01); *B62J 1/08* (2013.01); *B62J 3/00* (2013.01); *B62J 6/00* (2013.01); *B62K 25/04* (2013.01); *B62M 6/45* (2013.01); *B62M 9/122* (2013.01); *B62J 45/00* (2020.02); *B62J 45/20* (2020.02); *B62J 45/40* (2020.02); *B62M 6/55* (2013.01)

(58) Field of Classification Search
CPC ....... B62M 6/45; B62M 6/55; B60G 17/0165; B60G 2401/17; B60G 2400/823; F16F 9/46; B62K 2025/044; B60T 2210/30; B60W 50/14
See application file for complete search history.

(56) References Cited

U.S. PATENT DOCUMENTS

| | | | |
|---|---|---|---|
| 2005/0203685 A1* | 9/2005 | Kopf ......................... | B60T 8/00 |
| | | | 701/36 |
| 2009/0195435 A1* | 8/2009 | Kapilevich ............. | G01S 7/412 |
| | | | 342/22 |

(Continued)

FOREIGN PATENT DOCUMENTS

| | | |
|---|---|---|
| CN | 105980197 A | 9/2016 |
| CN | 106981209 A | 7/2017 |

(Continued)

*Primary Examiner* — Mirza F Alam
(74) *Attorney, Agent, or Firm* — Global IP Counselors, LLP

(57) ABSTRACT

An electronic controller and a control system are provided that allow the rider to comfortably ride a human-powered vehicle. The electronic controller includes at least one processor configured to control a notification device based on environmental information related to a surrounding environment of a human-powered vehicle.

12 Claims, 5 Drawing Sheets

(51) Int. Cl.
  *B62M 6/55* (2010.01)
  *B62J 45/00* (2020.01)
  *B62J 45/20* (2020.01)
  *B62J 45/40* (2020.01)

(56) References Cited

U.S. PATENT DOCUMENTS

| | | | |
|---|---|---|---|
| 2013/0085642 A1 | 4/2013 | Dankers | |
| 2013/0144520 A1* | 6/2013 | Ricci | G06K 9/00362 |
| | | | 701/301 |
| 2016/0090037 A1 | 3/2016 | Tetsuka et al. | |
| 2016/0339990 A1* | 11/2016 | Walthert | B62K 25/08 |
| 2017/0287217 A1 | 10/2017 | Kim et al. | |
| 2017/0353777 A1* | 12/2017 | Mach | G08B 21/12 |
| 2018/0129204 A1* | 5/2018 | Ricci | B60W 40/09 |
| 2018/0211535 A1* | 7/2018 | Mizuno | B60W 30/18154 |
| 2018/0334212 A1* | 11/2018 | Bowers | B62K 3/02 |

FOREIGN PATENT DOCUMENTS

| | | |
|---|---|---|
| DE | 10 2016 200 683 A1 | 7/2017 |
| JP | 2000-95169 A | 4/2000 |
| JP | 2006-351267 A | 12/2006 |
| JP | 2007-112316 A | 5/2007 |
| JP | 2012-166621 A | 9/2012 |
| JP | 2013-79937 A | 5/2013 |
| JP | 2013-171502 A | 9/2013 |
| JP | 2016-68606 A | 5/2016 |
| JP | 2016-97877 A | 5/2016 |

* cited by examiner

CONTROLLER AND CONTROL SYSTEM

CROSS-REFERENCE TO RELATED APPLICATIONS

This application claims priority to Japanese Patent Application No. 2017-223847, filed on Nov. 21, 2017. The entire disclosure of Japanese Patent Application No. 2017-223847 is hereby incorporated herein by reference.

BACKGROUND

Technical Field

The present disclosure generally relates to a controller and a control system mounted on a human-powered vehicle.

Background Information

Conventional controllers control various components of a human-powered vehicle based on operation of an operating device mounted on the human-powered vehicle. In a conventional controller, for example, the rider of a human-powered vehicle operates an operating device in accordance with the surrounding environment of the human-powered vehicle to control various components of the human-powered vehicle. The surrounding environment of the human-powered vehicle is, for example, visually checked and acknowledged by the rider. Japanese Laid-Open Patent Publication No. 2006-351267 (Patent document 1) discloses one example of a conventional controller.

SUMMARY

In a human-powered vehicle, it is desirable that the rider of a human-powered vehicle be able to comfortably ride the human-powered vehicle. One object of the present disclosure is to provide an electronic controller and a control system that allows the rider to comfortably ride the human-powered vehicle.

An electronic controller according to a first aspect of the present disclosure comprises at least one processor that is configured to obtain environmental information related to a surrounding environment of a human-powered vehicle. The at least one processor is further configured to output a control signal to control a notification device based on environmental information related to a surrounding environment of a human-powered vehicle. The rider of the human-powered vehicle acknowledges the environmental information from information output from the notification device. Thus, the rider can comfortably travel at ease.

In accordance with a second aspect of the present disclosure, the electronic controller according to the first aspect is configured so that the at least one processor is further configured control the notification device so that the notification device outputs at least one of vibration, sound, or visible light. Thus, the rider easily acknowledges information output from the notification device.

In accordance with a third aspect of the present disclosure, the electronic controller according to the first or second aspect is configured so that the environmental information includes at least one of information related to a slope of a road surface, information related to friction of a road surface, information related to an irregularity of a road surface, information related to an obstacle, information related to a road sign, information related to a road marking, or information related to another moving object. Thus, the rider can acknowledge various kinds of information output from the notification device.

In accordance with a fourth aspect of the present disclosure, the electronic controller according to any one of the first to third aspects is configured so that the at least one processor is further configured to control the notification device based on the environmental information and at least one of information related to a present position of the human-powered vehicle or traffic information. The notification device outputs detailed information. Thus, the rider can comfortably travel at ease.

In accordance with a fifth aspect of the present disclosure, the controller according to any one of the first to fourth aspects is configured so that the notification device includes at least one of a cycle computer, eyewear, a smartphone, a smartwatch, a lamp, a speaker, or a power source of an electric element producing a driving sound. Thus, the rider easily acknowledges information output from the notification device.

A control system according to a sixth aspect of the present disclosure comprises the electronic controller according to any one of the first to fifth aspects, and further comprises a detection device that is configured to detect an electromagnetic wave having a frequency of 30 GHz or higher and excluding visible light. The electronic controller obtains the environmental information from a detection result of the detection device and controls the notification device based on the obtained environmental information. The rider acknowledges the environmental information from information output from the notification device. Thus, the rider can comfortably travel at ease.

A control system according to a seventh aspect of the present disclosure includes a detection device configured to be arranged on a human-powered vehicle and an electronic controller comprising at least one processor configured to obtain environmental information related to a surrounding environment of the human-powered vehicle from a detection result of the detection device. The at least one processor is further configured to output a control signal to control a component of the human-powered vehicle based on the environmental information obtained from the detection device. The component includes at least one of a shifting device, a travel assist device assisting in travel of the human-powered vehicle, an adjustable seatpost, a brake device, a lamp, or a power generator. The component of the human-powered vehicle is controlled in accordance with the environmental information. Thus, the rider can comfortably travel.

In accordance with an eighth aspect of the present disclosure, the control system according to the seventh aspect is configured so that the detection device includes a human-powered vehicle coupling portion. Thus, the detection device is appropriately coupled to the human-powered vehicle by the human-powered vehicle coupling portion.

In accordance with a ninth aspect of the present disclosure, the control system according to the eighth aspect is configured so that the human-powered vehicle coupling portion of the detection device is a frame mounting bracket. The detection device is coupled to the frame, which is not easily affected by steering work of the steering device of the human-powered vehicle. This increases the detection accuracy of the detection device.

In accordance with a tenth aspect of the present disclosure, the control system according to the ninth aspect is configured so that frame mounting bracket is configured to be coupled to a support portion that supports a steering device to a frame of the human-powered vehicle. This increases the detection accuracy of the detection device. Additionally, the controller obtains environmental information about the front of the human-powered vehicle from a detection result of the detection device.

In accordance with an eleventh aspect of the present disclosure, the control system according to the eighth aspect is configured so that the frame mounting bracket is configured to be coupled to at least one of a steering device or a front fork of the human-powered vehicle. Thus, the electronic controller obtains environmental information about the front of the human-powered vehicle from a detection result of the detection device.

A control system according to a twelfth aspect of the present disclosure includes a detection device configured to be arranged on a frame of a human-powered vehicle and an electronic controller comprising at least one processor configured to obtain environmental information related to a surrounding environment of the human-powered vehicle from a detection result of the detection device. The at least one processor is further configured to output a control signal to control a component of the human-powered vehicle based on the obtained environmental information. The component of the human-powered vehicle is controlled in accordance with the environmental information. Thus, the rider can comfortably travel.

Similar to seventh aspect of the present disclosure, the component of the control system according to includes at least one of a shifting device, a travel assist device assisting in travel of the human-powered vehicle, a suspension, an adjustable seatpost, a brake device, a lamp, and a power generator. Various components of the human-powered vehicle are controlled. Thus, the rider can comfortably travel.

In accordance with a thirteenth aspect of the present disclosure, the control system according to any one of the seventh to twelfth aspects is configured so that the environmental information includes at least one of information related to a slope of a road surface, information related to friction of a road surface, information related to an irregularity of a road surface, information related to an obstacle, information related to a road sign, information related to a road marking, or information related to another moving object. Thus, the electronic controller appropriately controls the component of the human-powered vehicle.

In accordance with a fourteenth aspect of the present disclosure, the control system according to any one of the seventh to thirteenth aspects is configured so that the at least one processor is further configured to control the component based on the environmental information and at least one of information related to a present position of the human-powered vehicle and traffic information. The component of the human-powered vehicle is controlled based on detailed information. Thus, the rider can comfortably travel.

In accordance with a fifteenth aspect of the present disclosure, the control system according to any one of the sixth to fourteenth aspects is configured so that the detection device includes a housing, and the electronic controller is arranged at the housing. Thus, the electronic controller is protected from the exterior.

In accordance with a sixteenth aspect of the present disclosure, the control system according to any one of the sixth to fifteenth aspects is configured so that the electronic controller is arranged separately from the detection device. This increases the degree of freedom for arranging the electronic controller.

In accordance with a seventeenth aspect of the present disclosure, the control system according to any one of the sixth to sixteenth aspects is configured so that the detection device is configured to detect an electromagnetic wave including at least one of ultraviolet, infrared, a submillimeter wave, or a millimeter wave. This increases the detection accuracy of the detection device.

In accordance with an eighteenth aspect of the present disclosure, the control system according to any one of the sixth to seventeenth aspects is configured so that the detection device is configured to output an electromagnetic wave having a frequency of 30 GHz or higher and excluding visible light. The detection device is configured to detect the electromagnetic wave that is reflected. The detection device functions to output an electromagnetic wave. This reduces the number of components of the control system.

In accordance with a nineteenth aspect of the present disclosure, the control system according to the eighteenth aspect is configured so that the electromagnetic wave of the detection device includes at least one of ultraviolet, infrared, a submillimeter wave, or a millimeter wave. This increases the detection accuracy of the detection device.

The electronic controller and the control system according to the present disclosure allow the rider to comfortably ride the human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

Figure 1:
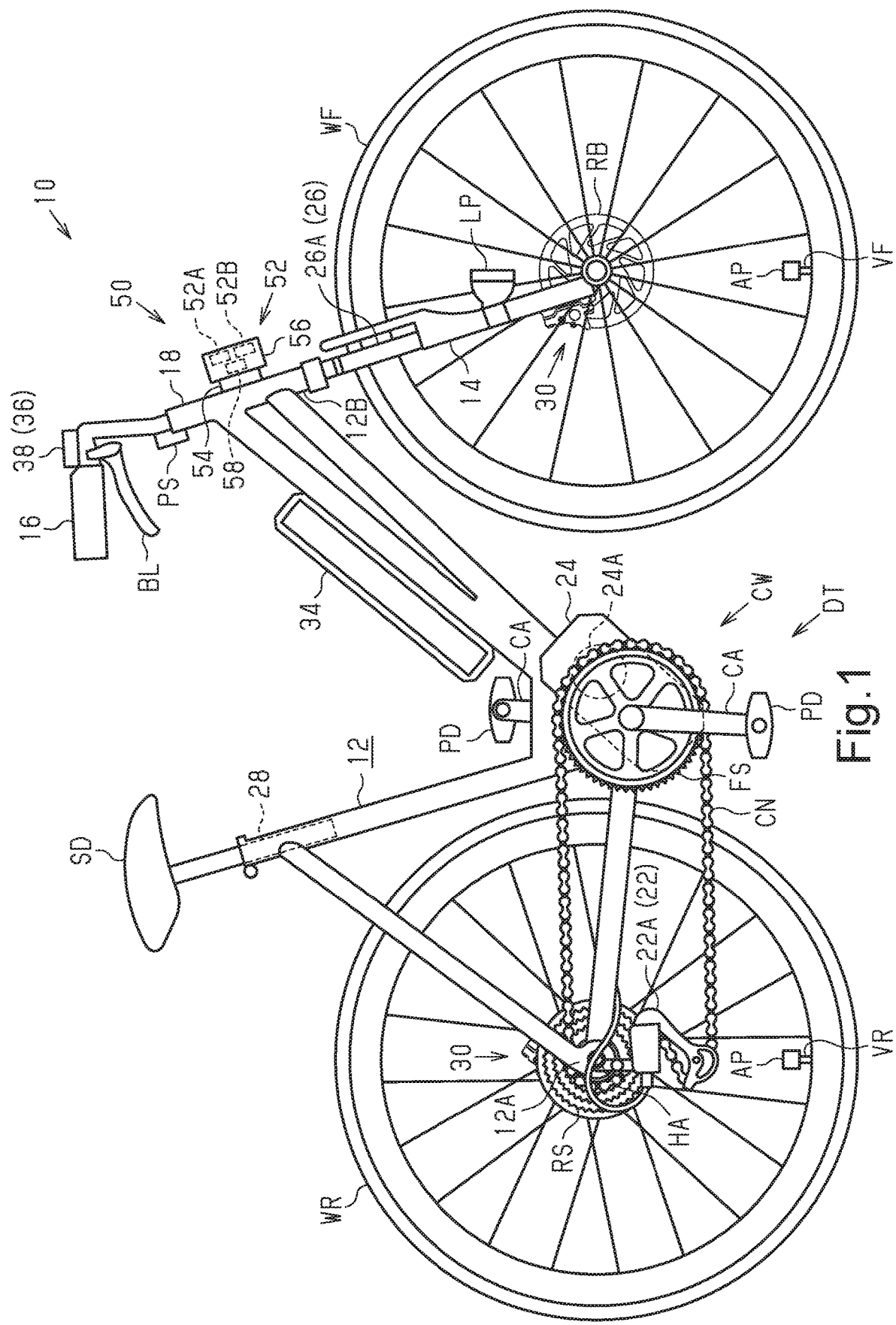
FIG. 1 is a side elevational view of a human-powered vehicle equipped with a control system in accordance with one embodiment.

A human-powered vehicle 10 including a control system 50 will now be described with reference to FIG. 1. FIG. 1 is a side view of the human-powered vehicle 10 including the control system 50. A human-powered vehicle stands for a vehicle that at least partially uses human power as driving power for traveling and includes a vehicle electrically assisting human power. The human-powered vehicle does not include a vehicle using only driving power other than human power. In particular, a vehicle using solely an internal combustion engine as driving power is not included in the human-powered vehicle. The human-powered vehicle is generally assumed to be a compact, light vehicle that does not require a license for driving on a public road. The human-powered vehicle 10 shown in the drawings includes a bicycle. More specifically, the human-powered vehicle 10 is a city bike. The human-powered vehicle 10 includes a frame 12, a front fork 14, a front wheel WF, a rear wheel WR, a steering device 16, and a drivetrain DT.

The drivetrain DT includes a crank assembly CW, a front sprocket FS, a rear sprocket RS, and a chain CN. The crank assembly CW includes a pair of crank arms CA and a pair of pedals PD. Each of the pedals PD is rotatably coupled to the distal end of the corresponding one of the crank arms CA.

The front sprocket FS is arranged on the crank assembly CW. The rear sprocket RS is arranged on a hub HA of the rear wheel WR. In one example, the chain CN runs around the front sprocket FS and the rear sprocket RS. Driving force applied by the rider of the human-powered vehicle 10 to the pedals PD is transmitted via the front sprocket FS, the chain CN, and the rear sprocket RS to the rear wheel WR.

The human-powered vehicle 10 further includes a component 20. The component 20 includes at least one of a shifting device 22, a travel assist device 24 assisting in travel of the human-powered vehicle 10, a suspension 26, an adjustable seatpost 28, brake devices 30, or a power generator 32 (refer to FIG. 2). Each of the components 20 is driven by electric power supplied from a battery 34 mounted on the human-powered vehicle 10 or a dedicated power supply (not shown). In one example, the battery 34 is arranged on an outer surface of the frame 12. At least part of the battery 34 can be arranged in the inner cavity of the frame 12.

The shifting device 22 includes, for example, a rear derailleur 22A. The rear derailleur 22A is arranged on a rear end 12A of the frame 12. The shifting device 22 can include a front derailleur (not shown). The shifting device 22 further includes a damper adjuster DA (refer to FIG. 2) configured to adjust shock absorbing force of a damper (not shown) arranged on the rear derailleur 22A. The travel assist device 24 functions to assist in propulsion force of the human-powered vehicle 10. The suspension 26 includes, for example, a front suspension 26A. The front suspension 26A functions to dampen impacts that the front wheel WF receives from the ground. The suspension 26 can include a rear suspension (not shown) functioning to dampen impacts that the rear wheel WR receives from the ground. The adjustable seatpost 28 functions to change the height of a saddle SD with respect to the frame 12. The brake devices 30 are each a disc brake device braking a rotary body RB of the human-powered vehicle 10. The rotary body RB is a disc brake rotor. The brake devices 30 are arranged on the front wheel WF and the rear wheel WR. The brake devices 30 brake the rotary bodies RB in accordance with operation input into brake operating devices BL coupled to the steering device 16. The power generator 32 includes at least one of a hub dynamo, a block dynamo, an assist regeneration mechanism, and a vibration power-generating element.

The component 20 can further include at least one of an air pressure adjuster AP and a steering assist device PS. The air pressure adjuster AP is provided, for example, corresponding to each of a valve VF of the front wheel WF and a valve VR of the rear wheel WR. One of the air pressure adjusters AP adjusts the air pressure of the front wheel WF. The other air pressure adjuster AP adjusts the air pressure of the rear wheel WR. The steering assist device PS is arranged, for example, in the vicinity of the steering device 16. The steering assist device PS assists in steering work of the steering device 16.

The human-powered vehicle 10 further includes a notification device 36. The notification device 36 includes at least one of a cycle computer 38, eyewear 40, a smartphone 42, a smartwatch 44, a lamp LP, a speaker 46, or a power source 48 of an electric element producing a driving sound (refer to FIG. 2). Each of the notification devices 36 is driven by electric power supplied from the battery 34 or a dedicated power supply. The cycle computer 38 is arranged, for example, on the steering device 16. The power source 48 is a power source included in various components 20. In the present embodiment, the power source 48 is a power source included in the shifting device 22. The power source 48 includes an electric motor (not shown). In one example, the power source 48 produces a driving sound by being driven in a manner that does not perform shifting.

The control system 50 includes a detection device 52 and an electronic controller 58. The term "electronic controller" as used herein refers to hardware that executes a software program. The electronic controller 58 will hereafter be referred to simply as the controller 58. The controller 58 includes an arithmetic processing unit executing predetermined control programs. The arithmetic processing unit includes, for example, a central processing unit (CPU) or a micro processing unit (MPU) that includes one or more processors. The controller 58 can include one or more microcomputers. The controller 58 can be formed of one or more semiconductor chips that are mounted on a printed circuit board. The detection device 52 is configured to detect an electromagnetic wave having a frequency of 30 GHz or higher while excluding visible light and. The definition of visible light conforms to the standard of International Organization for Standardization (ISO). For example, the range of frequencies of visible light approximately 400 THz to 790 THz. The detection device 52 outputs an electromagnetic wave having a frequency that is greater than or equal to 30 GHz and excluding a frequency in the visible light range. The detection device 52 detects a reflected electromagnetic wave. Thus, the ambient environment of the human-powered vehicle A is detected with high accuracy. The control system 50 is driven by electric power supplied from the battery 34 or a dedicated power supply. The detection device 52 is arranged on the human-powered vehicle 10. In one example, the detection device 52 is arranged on the frame 12 of the human-powered vehicle 10. The detection device 52 includes a human-powered vehicle coupling portion 54 that is configured to be coupled to the human-powered vehicle 10. In the present embodiment, the detection device 52 is coupled to the frame 12 of the human-powered vehicle 10 by the human-powered vehicle coupling portion 54. Thus, the coupling portion 54 is a frame mounting bracket as seen in FIG. 1.

The frame 12 includes a support portion 18 supporting the steering device 16. The support portion 18 includes a head tube 12B of the frame 12. Preferably, the detection device 52 is arranged at the front of the human-powered vehicle 10. Preferably, the detection device 52 is arranged on a portion that is not easily affected by steering work of the steering device 16. In the present embodiment, the detection device 52 is coupled to the support portion 18 of the frame 12 by the coupling portion 54 (the frame mounting bracket).

The detection device 52 outputs an electromagnetic wave excluding visible light and having a frequency of 30 GHz or higher and detects a reflected electromagnetic wave. In one example, the detection device 52 detects an electromagnetic wave including at least one of ultraviolet, infrared, a submillimeter wave, and a millimeter wave. In the present embodiment, the detection device 52 outputs an electromagnetic wave including at least one of ultraviolet, infrared, a submillimeter wave, or a millimeter wave. The detection device 52 is configured to detect a reflected electromagnetic wave.

The detection device 52 includes a configuration related to light detection and ranging (LiDAR). In other words, one example of the detection device 52 is a lidar detector that is configured to output an electromagnetic wave and then detect a reflected electromagnetic wave. More specifically, the detection device 52 further includes an output portion 52A and a detection portion 52B. The output portion 52A outputs an electromagnetic wave, for example, toward the surrounding of the human-powered vehicle 10. The output portion 52A, for example, is a light source such as a laser. The detection portion 52B, for example, is a light sensor such as a photodetector. The surrounding of the human-powered vehicle 10 includes at least one of the front, side, and rear of the human-powered vehicle 10. In the present embodiment, the output portion 52A outputs an electromagnetic wave toward the front and side of the human-powered vehicle 10. The detection portion 52B detects the electromagnetic wave output from the output portion 52A. More specifically, the detection portion 52B detects an electromagnetic wave that is output from the output portion 52A and reflected by an object present around the human-powered vehicle 10. The detection device 52 further includes a housing 56. The output portion 52A and the detection portion 52B are accommodated in the housing 56. Preferably, the housing 56 is formed from a material through which electromagnetic waves transmit. The controller 58 is arranged at the housing 56. In the present embodiment, the controller 58 is accommodated in the housing 56.

Figure 2:
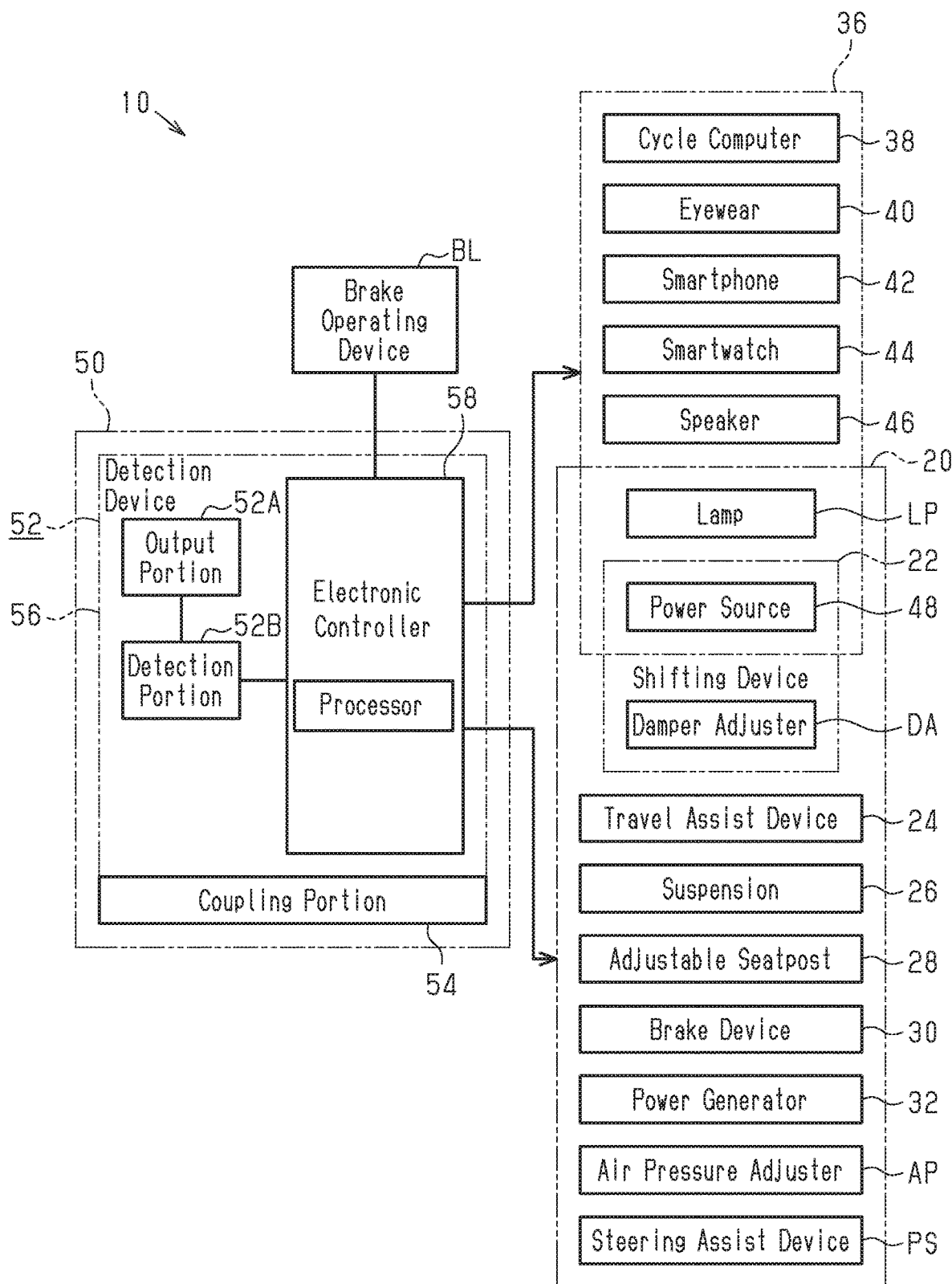
FIG. 2 is a block diagram showing the connection relationship between the control system of FIG. 1 and various components.

FIG. 2 shows the connection relationship between the control system 50 and each component of the human-powered vehicle 10. The controller 58 controls the notification device 36 based on environmental information related to a surrounding environment of the human-powered vehicle 10. More specifically, the controller 58 obtains environmental information from a detection result of the detection device 52 and controls the notification device 36 based on the obtained environmental information. The controller 58 controls the notification device 36 so that the notification device 36 outputs information perceivable by the rider. In one example, the controller 58 controls the notification device 36 so that the notification device 36 outputs at least one of vibration, sound, and visible light. The controller 58 can control the notification device 36 so that the notification device 36 outputs at least one of vibration, sound, visible light, scent, and wind.

The cycle computer 38 outputs, for example, at least one of sound or an image. The eyewear 40 outputs, for example, an image. The smartphone 42 outputs, for example, at least one of vibration, sound, visible light, or an image. The smartwatch 44 outputs, for example, at least one of vibration, sound, visible light, or an image. The lamp LP outputs, for example, visible light. The speaker 46 outputs, for example, sound. The power source 48 outputs, for example, sound. The notification device 36 can further include a device outputting at least one of scent and wind.

The environmental information includes at least one of information related to a slope of a road surface, information related to friction of a road surface, information related to irregularities of a road surface, information related to an obstacle, information related to a road sign, information related to a road marking, or information related to another moving object. The road marking includes a section line formed by, for example, road studs, paint drawn on a road surface, or stones.

The controller 58 controls the notification device 36 based on the environmental information and at least one of information related to the present position of the human-powered vehicle 10 and traffic information. The information related to the present position of the human-powered vehicle 10 is assumed, for example, based on the environmental information. The traffic information is externally obtained. In one example, the control system 50 externally obtains the traffic information.

The controller 58 controls the notification device 36, for example, based on the environmental information as follows. If the controller 58 obtains information related to a slope of a road surface, then the controller 58 has the notification device 36 output information related to the slope of the road surface. In one example, if the human-powered vehicle 10 is approaching an uphill slope or a downhill slope, then the controller 58 has the notification device 36 output information indicating that the human-powered vehicle 10 is approaching an uphill slope or a downhill slope. The controller 58 can have the notification device 36 output information related to a gradient of a road surface.

If the controller 58 obtains information related to friction of a road surface, then the controller 58 has the notification device 36 output information related to the friction of the road surface. In one example, if the human-powered vehicle 10 is approaching a road having a small friction coefficient, then the controller 58 has the notification device 36 output information indicating that the human-powered vehicle 10 is approaching a road having a small friction coefficient. Additionally, if the controller 58 assumes that there is a grating based on the friction coefficient of the road surface, then the controller 58 has the notification device 36 output information indicating the presence of a grating.

If the controller 58 obtains information related to irregularities of a road surface, then the controller 58 has the notification device 36 output information related to the irregularities of the road surface. In one example, if the human-powered vehicle 10 is approaching a road having a surface with large irregularities, then the controller 58 has the notification device 36 output information indicating that the human-powered vehicle 10 is approaching a road having a surface with large irregularities.

If the controller 58 obtains information related to an obstacle, then the controller 58 has the notification device 36 output information related to the obstacle. The obstacle includes a guardrail, a curb, and a tree branch. In one example, if the human-powered vehicle 10 is approaching an obstacle, then the controller 58 has the notification device 36 output information indicating that the human-powered vehicle 10 is approaching an obstacle.

If the controller 58 obtains information related to a road sign, then the controller 58 has the notification device 36 output information related to the road sign. This allows the rider to travel following the road sign. If the controller 58 obtains information related to a road marking, then the controller 58 has the notification device 36 output information related to the road marking. The information related to a road marking includes, for example, information related to an automobile-only road and information related to a bicycle-only road. This allows the rider to travel following the road marking.

If the controller 58 obtains information related to another moving object, then the controller 58 has the notification device 36 output information related to the moving object.

In one example, if the distance between the human-powered vehicle 10 and a moving object is shortening, then the controller 58 has the notification device 36 output information indicating that the distance between the human-powered vehicle 10 and the moving object is shortening. This limits interference of the human-powered vehicle 10 with the moving object even under a situation in which the field of view is narrow such as at an intersection. If the controller 58 obtains information related to another moving object, then the controller 58 can be configured to control the lamp LP so that the lamp LP emits light toward the moving object or control the speaker 46 so that the speaker 46 outputs sound toward the moving object. Additionally, if the difference in travel speed between the human-powered vehicle 10 and another moving object passing at the left side of the human-powered vehicle 10 is large, then the controller 58 assumes that the human-powered vehicle 10 is traveling on the right side of the road and has the notification device 36 output information prompting the rider to travel on the left side of the road. Additionally, if the controller 58 obtains information related to another moving object while the human-powered vehicle 10 is stopped, then the controller 58 controls the lamp LP so that the lamp LP emits light toward the moving object.

The controller 58 has the notification device 36 output traffic information about the vicinity of the human-powered vehicle 10 based on environmental information and traffic information. In one example, if the controller 58 obtains information related to a location where a traffic accident occurred in the past as traffic information, then the controller 58 has the notification device 36 output information indicating the positional relationship between the present position of the human-powered vehicle 10 and the location where the traffic accident occurred in the past. If the human-powered vehicle 10 is approaching a location where a traffic accident occurred in the past, then the controller 58 can be configured to have the notification device 36 output information indicating that the human-powered vehicle 10 is approaching the location where the traffic accident occurred in the past.

The controller 58 obtains environmental information from a detection result of the detection device 52 and controls the component 20 of the human-powered vehicle 10 based on the obtained environmental information. The controller 58 controls the component 20 based on the environmental information and at least one of information related to the present position of the human-powered vehicle 10 and traffic information.

The controller 58 controls the component 20, for example, based on the environmental information as follows. If the controller 58 obtains information related to an uphill slope as information related to a slope of a road surface, then the controller 58 controls the shifting device 22 to decrease the transmission ratio of the human-powered vehicle 10. In a case where the human-powered vehicle 10 is entering an intersection, if the controller 58 assumes that another moving object will traverse the forward direction of the human-powered vehicle 10 based on information related to another moving object, the controller 58 controls the shifting device 22 to decrease the transmission ratio of the human-powered vehicle 10. This limits interference of the human-powered vehicle 10 with the moving object. If the controller 58 obtains information related to irregularities of a road surface, then the controller 58 controls the damper adjuster DA so that the shock absorbing force of the damper arranged on the shifting device 22 functions. During execution of an automatic shifting mode, in which the shifting device 22 is automatically controlled in accordance with, for example, travel speed of the human-powered vehicle 10 and rotation speed of the crank arms CA, if the controller 58 obtains information related to an uphill slope as information related to a slope of a road surface, then the controller 58 can be configured to control the shifting device 22 so as not to temporarily increase the transmission ratio in the automatic shifting mode.

If the controller 58 obtains information related to an uphill slope as information related to a slope of a road surface, then the controller 58 controls the travel assist device 24 to increase the assist ratio of the human-powered vehicle 10. In a case where the human-powered vehicle 10 is entering an intersection, if the controller 58 assumes that another moving object will traverse the forward direction of the human-powered vehicle 10 based on information related to another moving object, then the controller 58 controls the travel assist device 24 to regenerate an electric motor 24A (refer to FIG. 1) included in the travel assist device 24. This limits interference of the human-powered vehicle 10 with the moving object. In this case, the electric motor 24A configures an assist regeneration mechanism of the power generator 32.

If the controller 58 obtains information related to irregularities of a road surface, then the controller 58 controls the hardness of the suspension 26 in accordance with the irregularities of the road surface. More specifically, the controller 58 changes at least one of damping force and repulsion force of the suspension 26. In one example, the controller 58 controls the suspension 26 to increase the hardness of the suspension 26 in a case where the road is flat and decrease the hardness of the suspension 26 in a case where the road surface has irregularities. If the controller 58 obtains information related to a slope of a road surface, then the controller 58 controls the travel amount of the suspension 26 in accordance with the slope of the road surface. In one example, in the human-powered vehicle 10 including a rear suspension, if the controller 58 obtains information related to an uphill slope, then the controller 58 controls the suspension 26 to increase the travel amount of the rear suspension and decrease the travel amount of the front suspension 26A. If the controller 58 obtains information related to a downhill slope, then the controller 58 controls the suspension 26 to increase the travel amount of the front suspension 26A and decrease the travel amount of the rear suspension.

If the controller 58 obtains information related to a slope of a road surface, then the controller 58 controls the adjustable seatpost 28 in accordance with the slope of the road surface. In one example, the controller 58 controls the adjustable seatpost 28 to raise the saddle SD in a case of obtaining information related to an uphill slope and lower the saddle SD in a case of obtaining information related to a downhill slope.

If the controller 58 assumes that the human-powered vehicle 10 is stopped on an uphill slope based on information related to a slope of a road surface, then the controller 58 controls the brake devices 30 to brake the rotary bodies RB. This restricts rearward movement of the human-powered vehicle 10 on the uphill slope. If the controller 58 obtains information related to friction of a road surface, then the controller 58 controls the brake devices 30 based on the friction coefficient of the road surface and operation input to the brake operating devices BL. If the controller 58 obtains information related to an obstacle, then the controller 58 controls the brake devices 30 so that the rotary bodies RB are braked with force that is greater than normal or intermittently braked in accordance with operation input to the brake operating devices BL. In a case where the human-powered vehicle 10 is entering an intersection, if the controller 58 assumes that another moving object will traverse the forward direction of the human-powered vehicle 10 based on information related to another moving object, then the controller 58 controls the brake devices 30 so that the rotary bodies RB are braked with force that is greater than normal or intermittently braked in accordance with operation input to the brake operating devices BL. This limits interference of the human-powered vehicle 10 with the moving object.

In a case where the human-powered vehicle 10 is entering an intersection, if the controller 58 assumes that another moving object will traverse the forward direction of the human-powered vehicle 10 based on information related to another moving object, then the controller 58 controls the lamp LP so that the lamp LP emits light toward the moving object. Thus, the moving object is notified of the presence of the human-powered vehicle 10. This limits interference of the human-powered vehicle 10 with the moving object. If the controller 58 obtains information related to a downhill slope as information related to a slope of a road surface or information related to irregularities of a road surface, then the controller 58 controls the power generator 32 so that the power generator 32 is driven.

If the controller 58 obtains information related to friction of a road surface, then the controller 58 controls the air pressure adjusters AP in accordance with the friction coefficient of the road surface. In one example, the controller 58 controls the air pressure adjusters AP to decrease the air pressure of the front wheel WF and the rear wheel WR in a case where the road surface is wet and increase the air pressure of the front wheel WF and the rear wheel WR in a case where the road surface is dry.

If the controller 58 obtains information related to an obstacle, then the controller 58 controls the steering assist device PS to avoid the obstacle. If the controller 58 obtains information related to irregularities of a road surface, then the controller 58 controls the steering assist device PS to stabilize steering work of the steering device 16.

Modifications

The description related to the above embodiment exemplifies, without any intention to limit, applicable forms of a controller and a control system according to the present disclosure. The controller and the control system according to the present disclosure are applicable to, for example, modifications of the above embodiment that are described below and combinations of at least two of the modifications that do not contradict each other. In the following modifications, the same reference characters are given to those elements that are the same as the corresponding elements of the embodiment. Such elements will not be described in detail.

Figure 3:
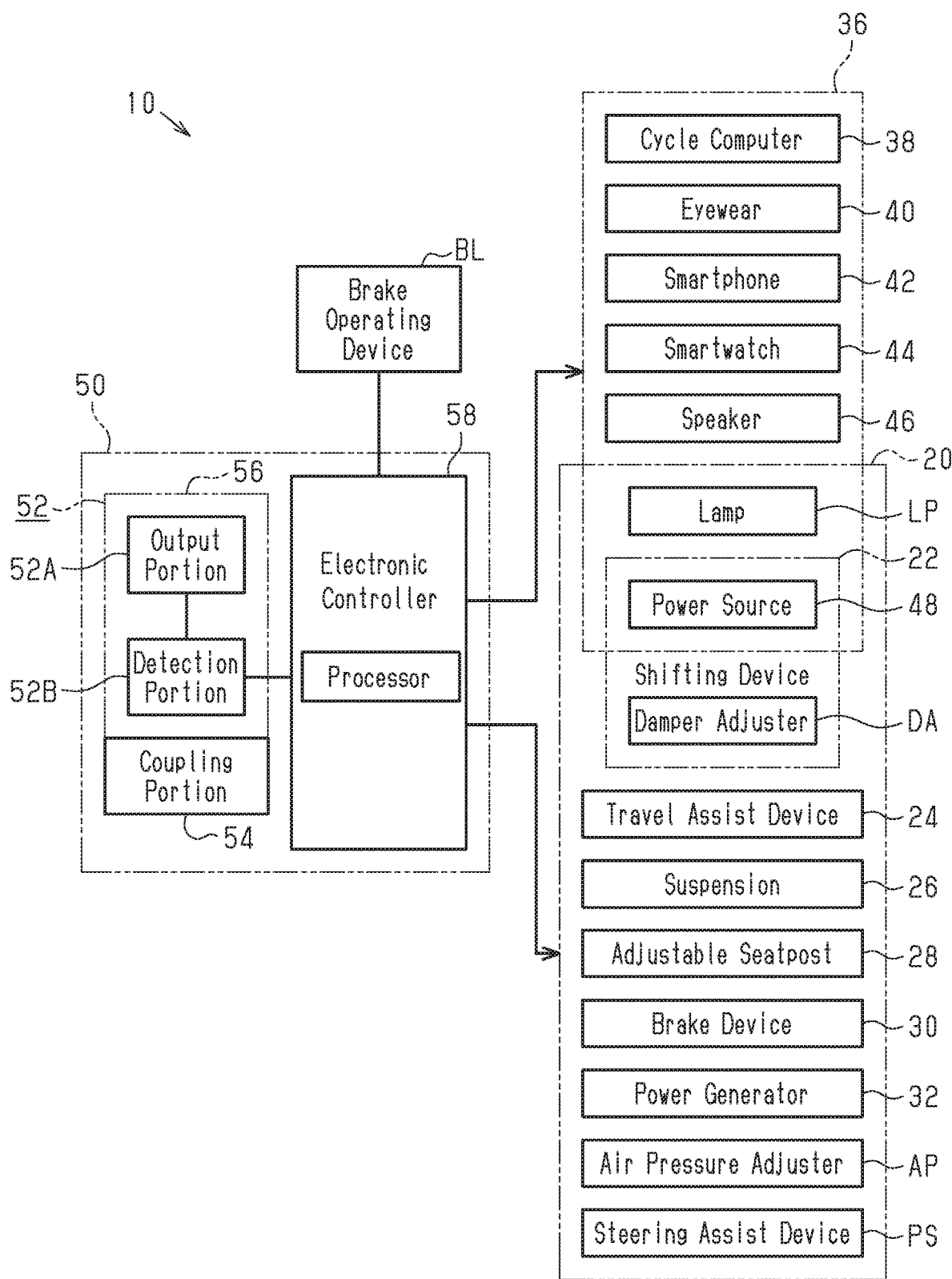
FIG. 3 is a block diagram showing the connection relationship between a modified control system and various components.

The position of the controller 58 can be changed in any manner. In one example, as shown in FIG. 3, the controller 58 is arranged separately from the detection device 52. In this example, the controller 58 can be accommodated, for example, in a housing of the travel assist device 24.

The function of the controller 58 can be changed in any manner. In a first modified embodiment, the controller 58 can be modified to control only the notification device 36 based on the environmental information. In the first modified embodiment, the output portion 52A can be omitted from the detection device 52, and the detection portion 52B can be configured to detect visible light. Further, in the first modified embodiment, the detection device 52 can be configured to detect an electromagnetic wave that is lower than 30 GHz. In a second embodiment, the controller 58 controls only the component 20 based on the environmental information. In the second embodiment, the detection device 52 can be configured to detect an electromagnetic wave that is lower than 30 GHz.

The configuration of the detection device 52 can be changed in any manner. In one modification, the output portion 52A is arranged separately from the detection device 52. In this modification, the output portion 52A outputs an electromagnetic wave having a frequency of 30 GHz or higher, while excluding visible light, and the detection device 52 detects a reflected electromagnetic wave.

Figure 4:
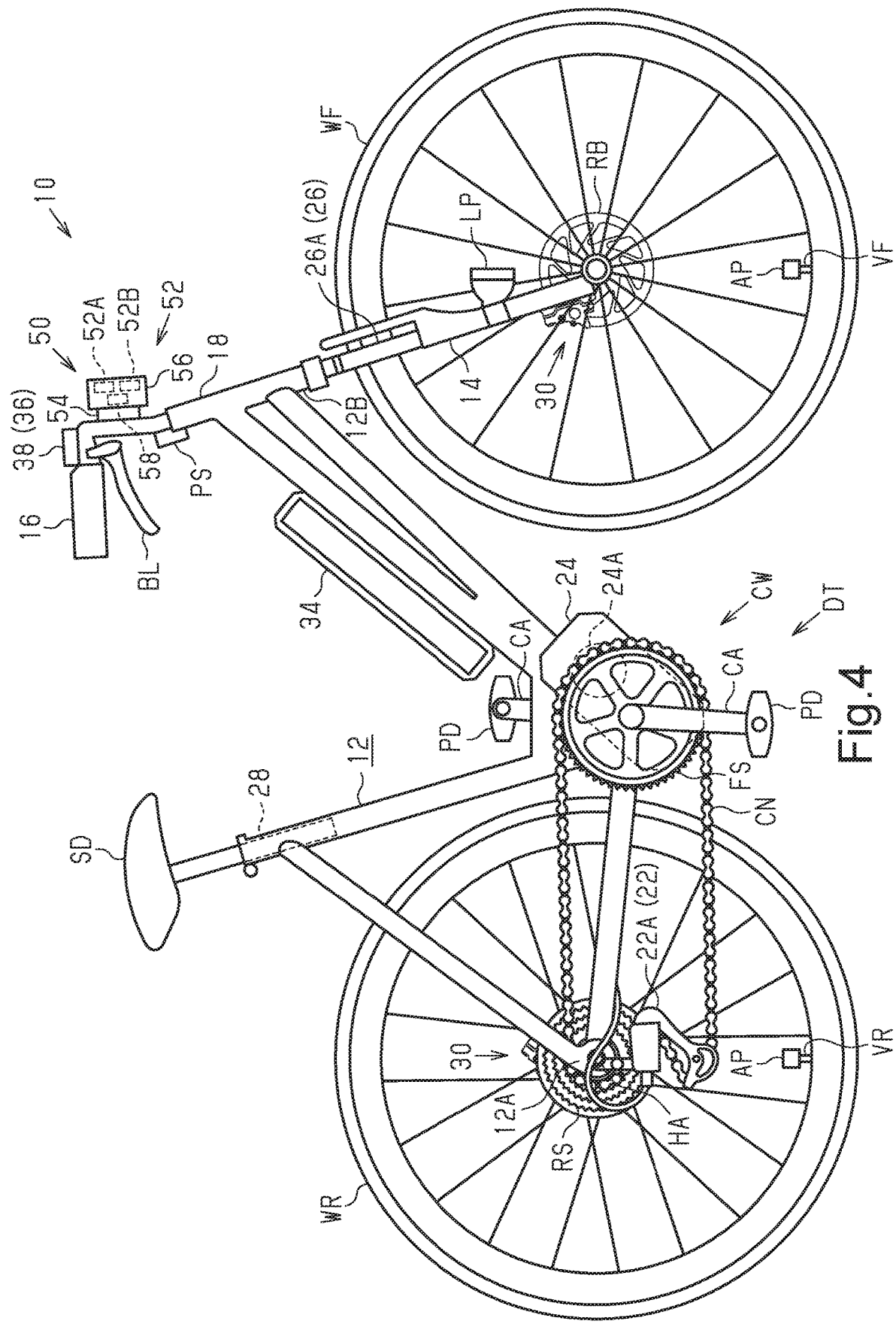
FIG. 4 is a side elevational view of a human-powered vehicle including a modified control system.
Figure 5:
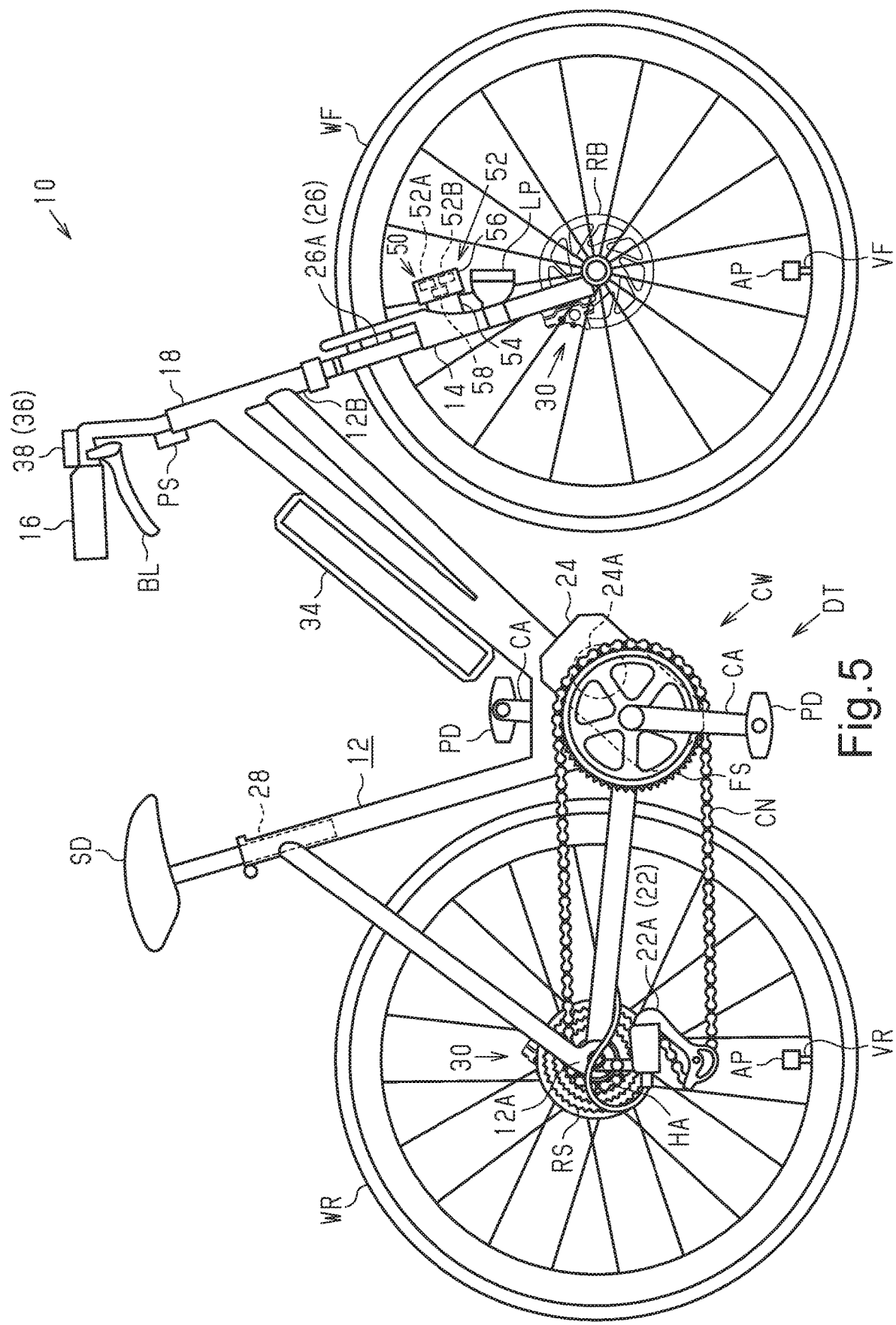
FIG. 5 is a side elevational view of a human-powered vehicle including a modified control system.

The component 20 can be changed to any kind. In one example, the component 20 include the shifting device 22, the travel assist device 24 assisting in travel of the human-powered vehicle 10, the adjustable seatpost 28, the brake devices 30, the lamp LP, and the power generator 32. In this modification, the position of the detection device 52 can be changed in any manner. In a first example, as shown in FIG. 1, the detection device 52 is coupled to the frame 12 of the human-powered vehicle 10 by the coupling portion 54. In a second modified embodiment, the detection device 52 is coupled to at least one of the steering device 16 and the front fork 14 of the human-powered vehicle 10 by the coupling portion 54. More specifically, as shown in FIG. 4, the detection device 52 can be coupled to the steering device 16 by the coupling portion 54. As shown in FIG. 5, the detection device 52 can be coupled to the front fork 14 by the coupling portion 54. The detection device 52 can be coupled to each of the steering device 16 and the front fork 14 by the coupling portion 54. In a third embodiment, the detection device 52 is arranged on a carrier (not shown) of the human-powered vehicle 10. In the third example, it is preferred that the output portion 52A output an electromagnetic wave toward the rear and side of the human-powered vehicle 10. If the controller 58 obtains information related to another moving object moving at the rear of the human-powered vehicle 10, then the controller 58 has the notification device 36 output information related to the moving object. The number of detection devices 52 can be changed to any number. In one example, the number of detection devices 52 is two or more. The detection devices 52 are arranged, for example, on at least two of the front fork 14, the steering device 16, the support portion 18, and the carrier.

The human-powered vehicle 10 can be changed in any manner. In a first example, the human-powered vehicle 10 is a road bike, a mountain bike, a trekking bike, a cross bike, a cargo bike, or a recumbent bike. In another embodiment, the human-powered vehicle 10 is a kick scooter.

What is claimed is:

1. A control system comprising:
a detection device arranged on a human-powered vehicle; and
an electronic controller comprising at least one processor configured to obtain environmental information related to a surrounding environment of the human-powered vehicle from a detection result of the detection device, the at least one processor being further configured to output a control signal to control a component of the human-powered vehicle based on the environmental information obtained from the detection device, the component including at least one of a shifting device, a travel assist device assisting in travel of the human-powered vehicle, an adjustable seatpost, a brake device, a lamp, or a power generator, the controlling of the adjustable seatpost includes changing a height of a saddle of the adjustable seatpost, and the environmental information including at least one of information related to a slope of a road surface, information related to friction of a road surface, information related to an irregularity of a road surface, information related to an obstacle, information related to a road sign, information related to a road marking, or information related to another moving object.

2. The control system according to claim 1, wherein the detection device includes a human-powered vehicle coupling portion.

3. The control system according to claim 2, wherein the human-powered vehicle coupling portion of the detection device is a frame mounting bracket.

4. The control system according to claim 3, wherein the frame mounting bracket is coupled to a support portion that supports a steering device to a frame of the human-powered vehicle.

5. The control system according to claim 2, wherein the frame mounting bracket is coupled to at least one of a steering device or a front fork of the human-powered vehicle.

6. A control system comprising:

a detection device arranged on a frame of a human-powered vehicle; and an electronic controller comprising at least one processor configured to obtain environmental information related to a surrounding environment of the human-powered vehicle from a detection result of the detection device, the at least one processor being further configured to output a control signal to control at least two different functions of components of the human-powered vehicle based on the environmental information obtained from the detection device, and the environmental information including at least one of information related to a slope of a road surface, information related to friction of a road surface, information related to an irregularity of a road surface, information related to an obstacle, information related to a road sign, information related to a road marking, or information related to another moving object.

7. The control system according to claim 6, wherein the at least one processor is further configured to control the component based on the environmental information and at least one of information related to a present position of the human-powered vehicle or traffic information.

8. The control system according to claim 6, wherein the detection device includes a housing, and the electronic controller is arranged at the housing.

9. The control system according to claim 6, wherein the electronic controller is arranged separately from the detection device.

10. The control system according to claim 6, wherein the detection device is configured to detect an electromagnetic wave including at least one of ultraviolet, infrared, a submillimeter wave, or a millimeter wave.

11. The control system according to claim 6, wherein the detection device is configured to output an electromagnetic wave having a frequency of 30 GHz or higher and excluding visible light, and the detection device is configured to detect the electromagnetic wave that is reflected.

12. The control system according to claim 11, wherein the electromagnetic wave of the detection device includes at least one of ultraviolet, infrared, a submillimeter wave, or a millimeter wave.

* * * * *